(12) United States Patent
Liang et al.

(10) Patent No.: US 7,212,297 B2
(45) Date of Patent: May 1, 2007

(54) UNIVERSAL PRINTING SYSTEM

(75) Inventors: Ping Liang, Irvine, CA (US); Minghua Chen, Irvine, CA (US)

(73) Assignee: Transdimension Inc., Irvine, CA (US)

( * ) Notice: Subject to any disclaimer, the term of this patent is extended or adjusted under 35 U.S.C. 154(b) by 742 days.

(21) Appl. No.: 10/164,148

(22) Filed: Jun. 5, 2002

(65) Prior Publication Data
US 2003/0227640 A1    Dec. 11, 2003

(51) Int. Cl.
*G06F 15/16* (2006.01)
(52) U.S. Cl. .................... 358/1.13; 358/1.15
(58) Field of Classification Search ............. None
See application file for complete search history.

(56) References Cited

U.S. PATENT DOCUMENTS 5,960,168 A * 9/1999 Shaw et al. ............ 358/1.15

2002/0065873 A1 * 5/2002 Ishizuka ................ 709/203
2002/0111963 A1 * 8/2002 Gebert et al. ........... 707/513
2002/0171857 A1 * 11/2002 Hisatomi et al. ........ 358/1.13

\* cited by examiner

*Primary Examiner*—Mark Zimmerman
*Assistant Examiner*—Jacob P. Rohwer
(74) *Attorney, Agent, or Firm*—Klein, O'Neill & Singh, LLP

(57) ABSTRACT

A method and system for printing content from a computing device is provided. Content from the computing device is converted to a device independent format and printed in the device independent format. The content is converted using a mark-up language, which also defines the style of the content. The converted content description format is pre-loaded in the computing device and is provided to the printing device. The mark-up language may be XML and the description format may be in the is in the extensible Style sheet language ("XSL") or extensible Style sheet language Transformation ("XSLT") format.

23 Claims, 8 Drawing Sheets

UNIVERSAL PRINTING SYSTEM

BACKGROUND OF THE INVENTION

1. Field of the Invention

This invention relates to device drivers, and more particularly to a format independent system that can be used by computing devices for printing.

2. Background

Portable computing devices including personal digital assistants ("PDAs"), mobile phones and other similar computing devices ("collectively referred to herein as "handheld devices") are widespread in today's business and personal lives. Most handheld devices generally store important business and/or personal information, e.g., address books, daily planners, memo-pads, calendars, project lists, and/or expense reports etc. A typical handheld device has limited computing power and low memory storage space for storing content.

One who uses a handheld device, generally carries it from place to place. Often, a handheld device user needs to print stored content from the handheld device. Generally, in order to print from a computing device, an application issues a user prompted print command to print content. A printer driver is required to facilitate the transfer of print data from the computing device to a printing device (hereinafter referred to as a "printer" or "printers").

One technique commonly used by applications (e.g. Microsoft Outlook, Microsoft Corporation®) is called "spooling". The application from which content is to be printed is spooled as a "spool file" on a storage media. The operating system (OS) spools up all the calls that the application makes to the printer driver and saves the calls in a spool file along with a copy of the print content. Then the spooled file with the print content is read from the storage media and handed to the printer driver. The printer driver takes the spooled file and creates a high level Printer Description Language File ("PDL file") and stores the PDL file on the storage media. The PDL file is then sent to the printer engine of the printer, and printed.

One example of the foregoing printer driver system is shown in FIG. 1. Based on user input, Application 100 converts the desired print content into graphical device interface ("GDI") format 101 or other text commands and graphics primitives. The print job may be spooled to a spool file 102, which is stored on a storage media (not shown). These commands may be formatted by printer driver 105 into a recognizable industry defined data definition (e.g. PCL), or to a device specific format, to create print commands 103 to control printer 104. Print commands 103 are sent to printer 104 with print content from spool file 102, which is then printed. Printer 104 may not be physically attached to a computing device where application 100 and printer driver 105 reside, but may be remotely located such as on a LAN network (not shown).

Most computing devices require device specific printer drivers, so that computer applications can interface with printer drivers and print content. Printer drivers in general require large memory space for storage. This becomes a problem for handheld devices because such devices have limited memory storage space. Also, since most printers require a specific printer driver, printing from a handheld device becomes very difficult because the handheld device may not be able to store multiple printer drivers.

Therefore, there is a need for a system that allows a handheld device to print data at any printer using a standard device independent format.

SUMMARY OF THE INVENTION

The present invention addresses the foregoing by providing a process and system that converts computing device application content into a mark-up language format, which is recognized by a printing device, and a device specific printer driver is not required to print the application content.

In one embodiment, the present invention concerns a method for printing content from a computing device. The process converts the content from the computing device into a device independent format; and prints the content in the device independent format. The content is converted using a mark-up language, which also defines the style of the content. The converted content description format is preloaded in the computing device and is provided to the printing device. The mark-up language may be extensible Mark-up Language ("XML") and the description format may be in the extensible Style Sheet Language ("XSL") and/or extensible Style Sheet Language Transformation ("XSLT") format.

In another aspect, the present invention concerns a system for printing content from a computing device in a device independent format. The system includes a universal engine, wherein the universal engine converts content from an application into a mark-up language format. The system also includes plural style sheets, wherein the style sheets define the format of the content that is converted by the universal engine. The mark-up language may be XML and the style sheets may be in the XSL/XSLT format.

In yet another aspect of the present invention, a computing device for printing content at a printing device is provided. The computing device includes a universal engine, wherein the universal engine converts content from an application into a mark-up language format. The computing device further includes plural style sheets, wherein the style sheets define the format of the content converted by the universal engine. The mark-up language may be XML and the style sheets may be in the XSL/XSLT format.

In yet another aspect, a printing device for printing content from a computing device in a mark-up language is provided. The printing device is pre-loaded with content format information. The mark-up language may be XML and the content format information may be in the XSL/XSLT format.

In yet another aspect, the present invention does not require memory intensive, device specific printer drivers for printing content from a computing device.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

Figure 2:
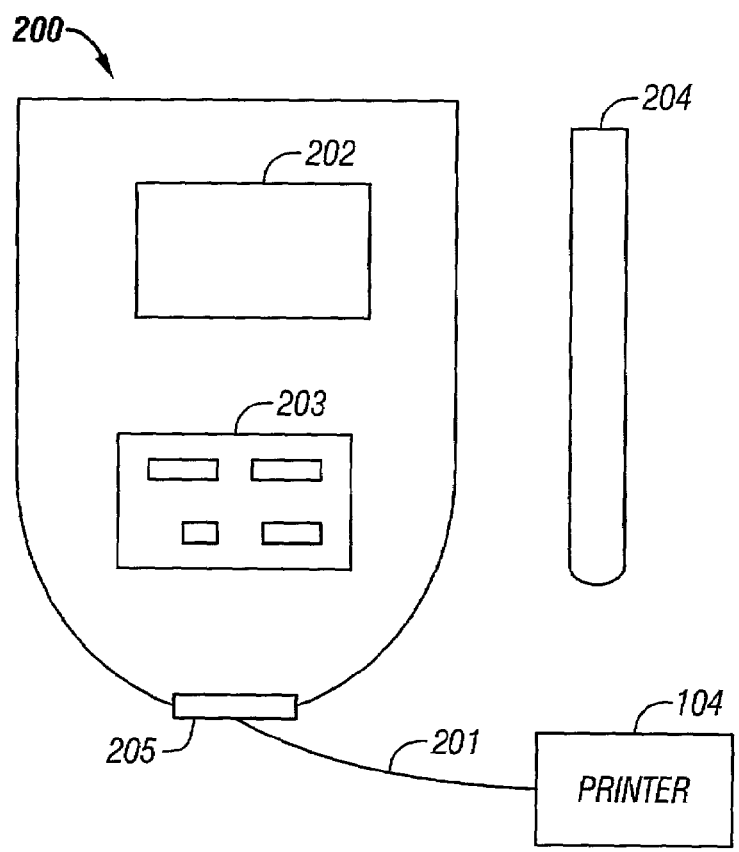
FIG. 2 is a block diagram of a handheld device coupled to a printer, embodying the present invention.

FIG. 2 is an outward view showing a representative handheld device embodying the present invention. Handheld device 200 may operate under operating system, e.g., Pocket PC formerly called Windows CE (Microsoft Corporation®), or Palm OS (3 Com Corporation®). Handheld device 200 includes a display area 202 that may also be used as a writing tablet or a touch screen for inputting commands and/or data, and plural buttons 203 that are used to operate handheld device 200. Handheld device 200 interfaces with printer 104 via interface 205 and connection 201. It is noteworthy that connection 201 may be a parallel cable, USB cable, an infrared cable less connection, or any other means. Printer 104 may be any type of printer such as an inkjet printer, laser printer, thermal printer, dot matrix, or the like.

Also shown in FIG. 2 is stylus 204 that is used to write in display area 202. Content (not shown) may also be input using one or more of the plural buttons 203 or via another computing device that interfaces with handheld device 200 via interface 205.

Figure 3:
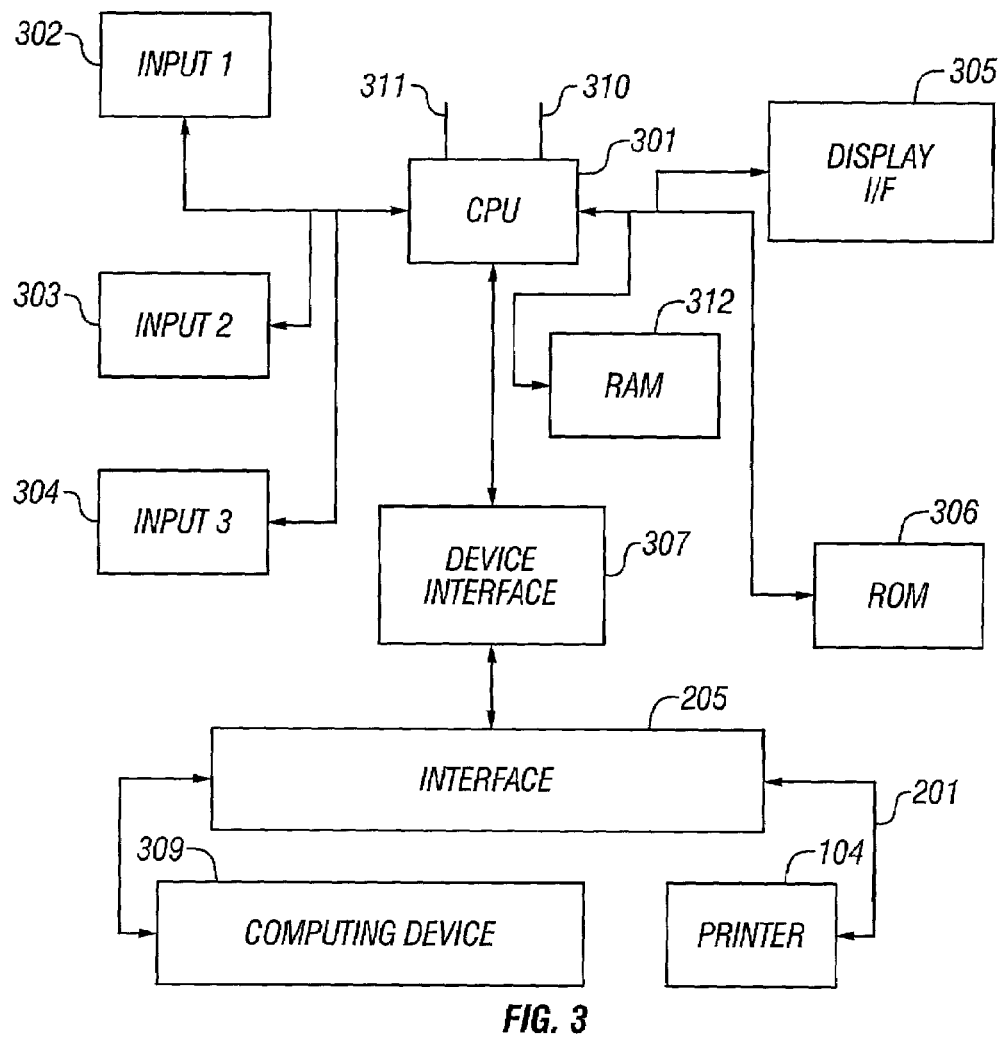
FIG. 3 is a block diagram showing some of the components used in a handheld device, embodying the present invention.

FIG. 3 is a block diagram showing the internal functional architecture of handheld device 200. As shown in FIG. 3, handheld device 200 includes central processing unit ("CPU") 301 that interfaces with various components described below and is used for executing computer-executable process steps including those discussed below, according to an aspect of the present invention.

CPU 301 may receive input from various sources including a touch screen 202 via a touch screen interface 302, plural buttons 203 via button interface 303; and other external sources, e.g., keyboard (not shown) via interface 304.

CPU 301 also interfaces with device interface 307 that allows handheld device 200 to be connected to another computing device 309 and/or printer 104 via interface 205. Interface 205 may be a USB serial interface, IEEE 1394, or any other interface.

CPU 301 also interfaces with a display interface 305 for displaying data in display area 202.

A random access main memory ("RAM") 312 also interfaces with CPU 301 to provide CPU 301 with access to memory storage. When executing stored computer-executable process steps CPU 301 stores those process steps in RAM 312 and executes the stored process steps out of RAM 312.

Read only memory ("ROM") 306 is provided to store invariant instruction sequences such as start-up instruction sequences or basic Input/output operating system (BIOS) sequences. ROM 306 may also store basic programs, e.g., address book, calendar, memo pads and the operating system.

Also shown in FIG. 3 are a wireless port 311 that interfaces CPU 301 with a wireless network; and an infrared port 310 that provides a cable-less connection between handheld device 200 and other peripherals including printer 104.

It is noteworthy that the present invention is not limited to a handheld computer architecture described above. The various aspects of the present invention may be implemented on a stand-alone desktop computer or one that is coupled to a network.

Figure 4:
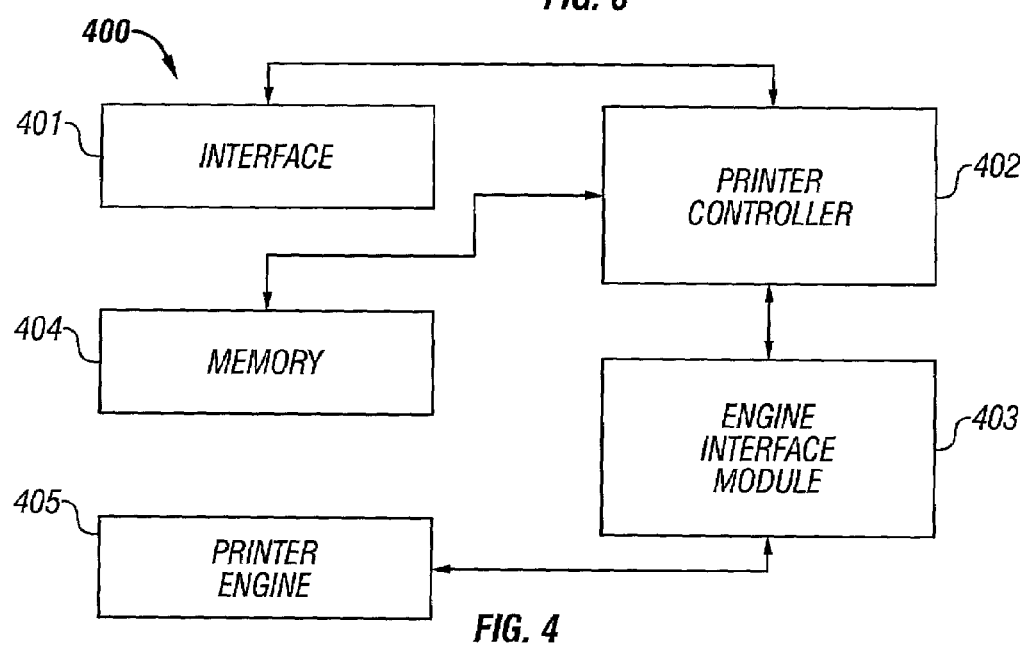
FIG. 4 is a block diagram of printer architecture according to an aspect of the present invention.

FIG. 4 shows a block diagram of printer architecture 400 to execute computer-executable process steps according to one aspect of the present invention. Printer architecture 400 may be used in printer 104. FIG. 4 includes an interface unit 401 connected to a computing device (not shown), a printer controller 402, memory 404, a printer engine interface module 403 and a printer engine 405.

Printer controller 402 controls the transmission of print content received from the computing device and sent to printer engine 405. Printer controller 402 also controls transmission of all information from printer engine 405 to the computing device.

Memory 404 stores the print data received from a computing device for compensating the difference between input speed of print data from the computing device and processing speed of printer engine 405.

Engine interface module 403 exchanges information with printer engine 405 for facilitating the printing process and acts as an intermediary between printer controller 402 and engine interface module 403.

Printer 104 may have various capabilities to print content, for example, printer 104 is command responsive if printer 104 responds to a command by handheld device 200 or any other computing device including without limitation a desktop computer, notebook, set-top box and others.

Printer 104 may also be queryable. In this state printer 104 responds to a request from handheld device 200 or any other computing devices' commands. For example, printer 104 may provide handheld device 200 a status on a particular print job when handheld device 200 requests such a status.

In one aspect of the present invention, printer 104 may be configured as being only command responsive, queryable or both. Such configuration may be performed manually before printing a specific print job or automatically configured.

Handheld device 200 can also perform a verification test to determine if printer 104 is responsive or not. Handheld device 200 sends a command to printer 104 and if the printer accepts or rejects the command, then handheld device concludes that printer 104 is responsive.

If printer 104 is command responsive and not queryable, handheld device 200 may send pre-defined commands that only require an accept or reject response from printer 104. This way, handheld device 200 can ascertain the ability of printer 104 to print content.

Figure 5:
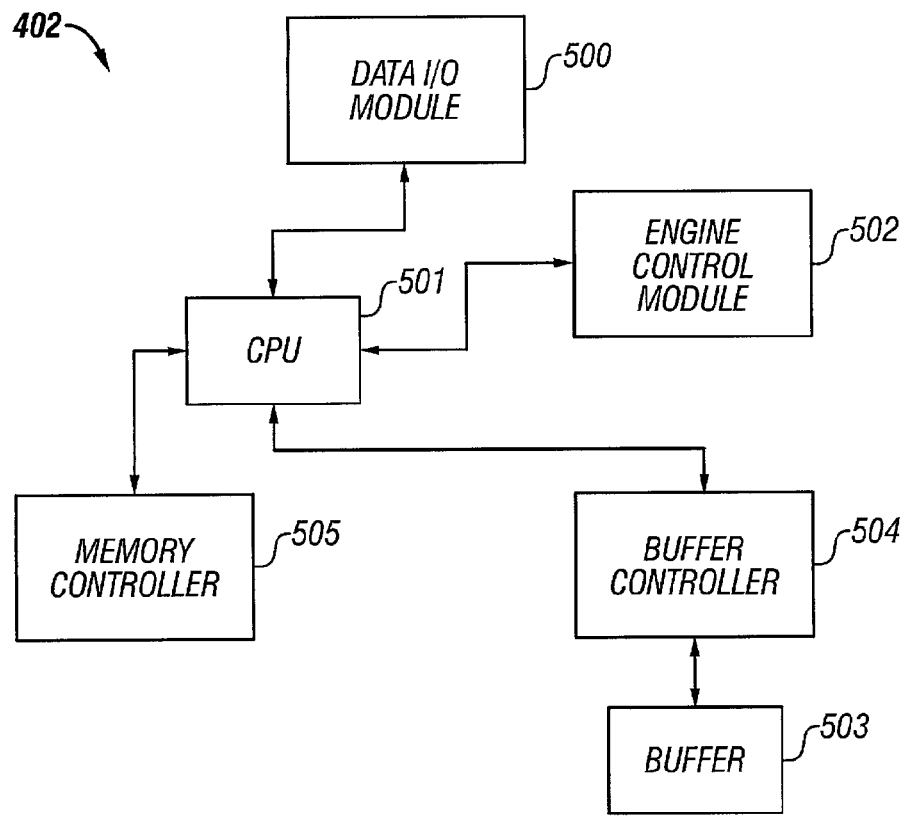
FIG. 5 is a block diagram of a printer controller used in an embodiment of the present invention.

FIG. 5 provides a block diagram of printer controller 402 architecture for executing computer-executable process steps according to one aspect of the present invention. As shown in FIG. 5, printer controller 402 includes data input/output module 500, CPU 501, memory controller 505, a buffer controller 504, buffer 503 and an engine control module 502.

Data input/output module 500 recognizes the type of information received from a computing device, e.g. a handheld device 200 or any other computing device. Thereafter it inputs control commands, sends status confirmation, and print data to CPU 501 through a predetermined conversion process, and transmits the output of CPU 501 to the computing device after a predetermined conversion process.

CPU 501 controls the overall flow of print data. Memory controller 505 stores or reads the read/registration signal input from CPU 501 to memory 404, and transmits a control signal in accordance with the time required by memory 404.

Buffer controller 504 stores or reads the read/registration signal input from CPU 501 to buffer 503 and transmits the control signal in accordance with the time required by buffer 503. Buffer 503 stores a specific amount of print data transmitted from engine control module 502 and transmits the stored amount to printer engine 405 for printing. Engine control module 502 recognizes the type of print data, transmits a control command to printer engine 405, and transmits any status confirmation to the computing device through CPU 501.

Figure 6A:
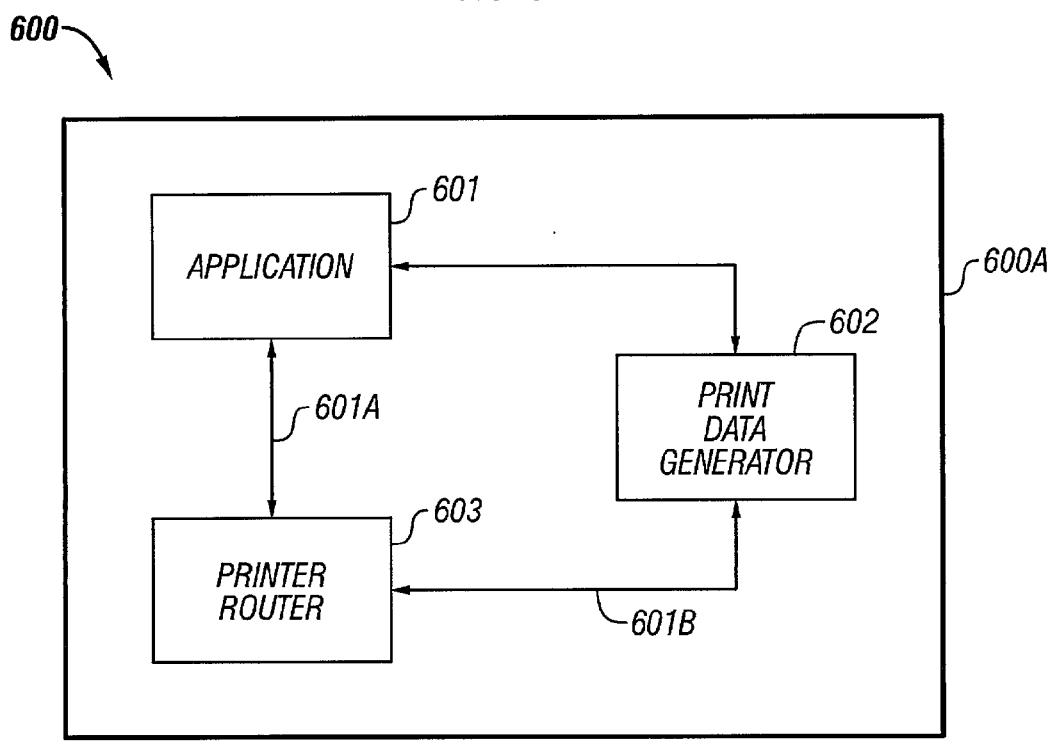
FIG. 6A is a block diagram of a system, according to one aspect of the present invention.

FIG. 6A shows a block diagram of a universal printing system 600, according to one aspect of the present invention. System 600 includes application 601, which is similar to application 101 and issues a print command based upon user input. Application 601 runs under operating system 600A, which may be, Pocket PC formerly called Windows CE (Microsoft Corporation®), Palm OS (3 Com Corporation®) or any other windows or non-Windows based operating system used for running a computing device. Also included in system 600 is print data generator 602 that converts print content 601A from application 601 into a format that is device and driver independent and can be printed by printer 104.

In one aspect of the present invention, print data generator 602 converts content 601A into XML (extensible Markup Language as described in XML specification published by W3C consortium, Oct. 20, 2000) format. XML, describes a class of data objects called XML documents and partially describes the behavior of computer programs which process them. XML is an application profile or a restricted form of SGML, the Standard Generalized Markup Language [ISO standard 8879].

XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure. A set of tags is used to define content 601A in open and closed tag pairs into a hierarchical embedding structure.

The sets of tags are also used to set the level of detail that a computer user wants to see in a printed document. Hence various set of tags may be used to print different level of detail and layout. For example, a basic XML set of tags may be used that can be accessed by devices like handheld 200 and other computing devices. Computing devices with higher computing power and memory storage than a handheld device, for example a desktop computer or a laptop, may use an intermediate or extended XML sets.

Figure 1:
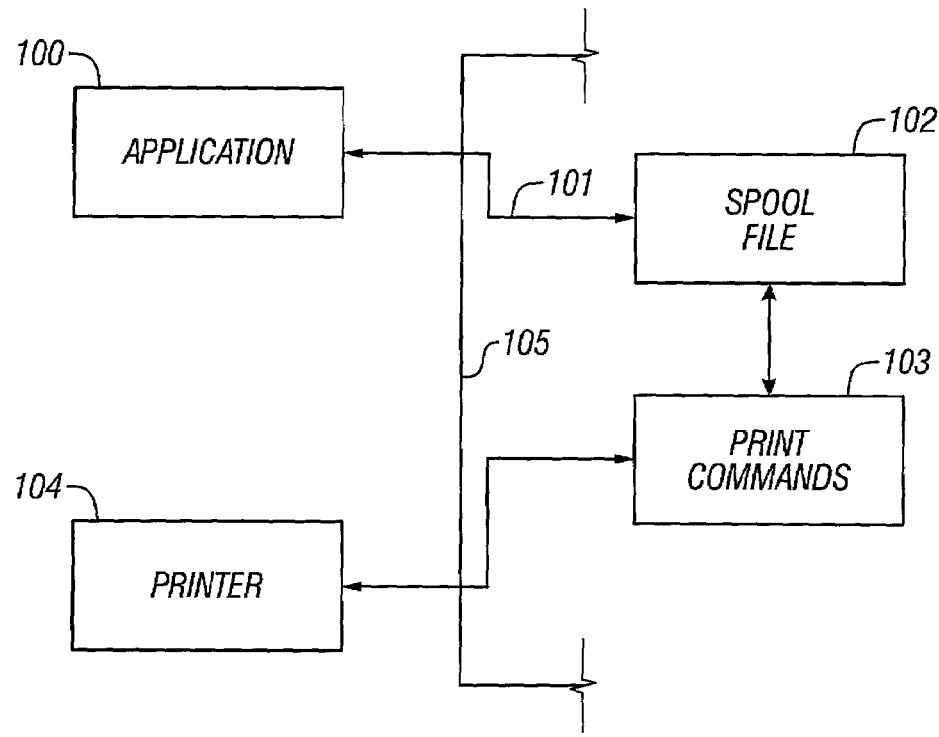
FIG. 1, as described above, illustrates a conventional printing system.

Also included in system 600 is a printer router 603, that routes print data based upon whether it should be printed using a universal format (e.g. XML) or if a device specific printer driver 105 (FIG. 1) is available for printing. Printer router 603 receives print commands from application 601. Printer router 603 determines if a device specific printer driver is available, and if it is, then content 601A is printed by the standard printer driver 105 (FIG. 1). If printer router 603 determines that no printer driver is available, then printer router 603 receives print content 601A and sends it to print data generator 602. Alternatively, printer router 603 may request application 601 to send print content 601A directly to print data generator 602 for processing.

It is noteworthy that the foregoing components of system 600 may not be separate modules, but instead may be integrated into one or more than one module.

Figure 6B:
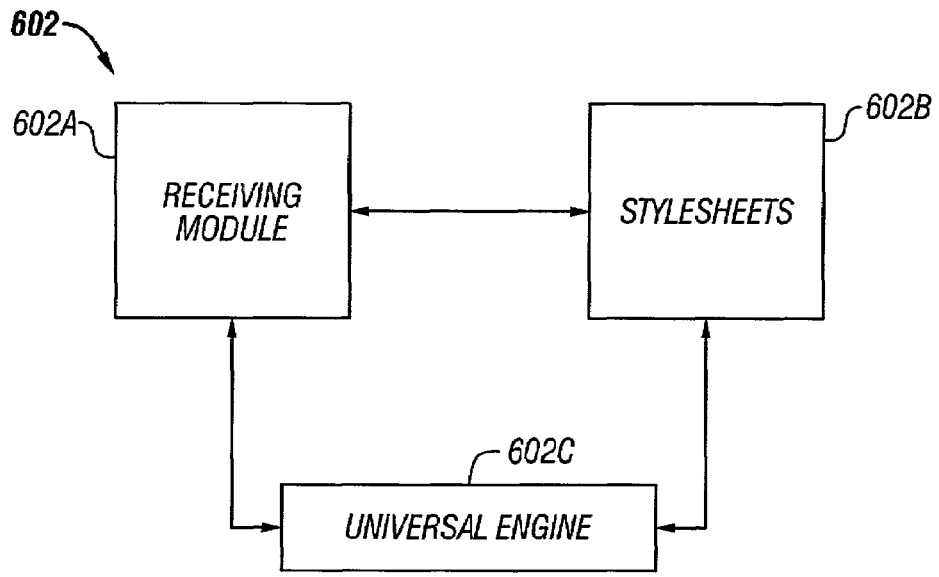
FIG. 6B is a block diagram of a print data generator, according to an aspect of the present invention.

FIG. 6B shows a block diagram of print data generator 602 that includes a receiving module 602A, style sheets 602B and a universal engine 602C. Receiving module 602A receives content 601A from application 601 or printer 603. Style sheets 602B are used to convert content 601A into a universal format. Universal engine 602C converts content 601A into a standard format based upon the pre-loaded or downloaded style sheets 602B.

One such universal engine is a XSL/XSLT engine that reads XSL/XSLT style sheets 602B, which are XML documents with a set of predefined tags, and syntax meeting the XSL/XSLT standard. Style sheets 602B communicate to universal engine 602C as to how tags and the embedded content in a XML document be transformed for reproduction. Universal engine 602C may produce a XSL/XSLT document 602C which is a specific XML format with a standard set of tags for being reproduced, implying that a display device will be able to reproduce the XML document.

It is noteworthy that the foregoing components of print data generator 602 may not be separate modules, but instead may be integrated into one, or more than one module.

Figure 6C:
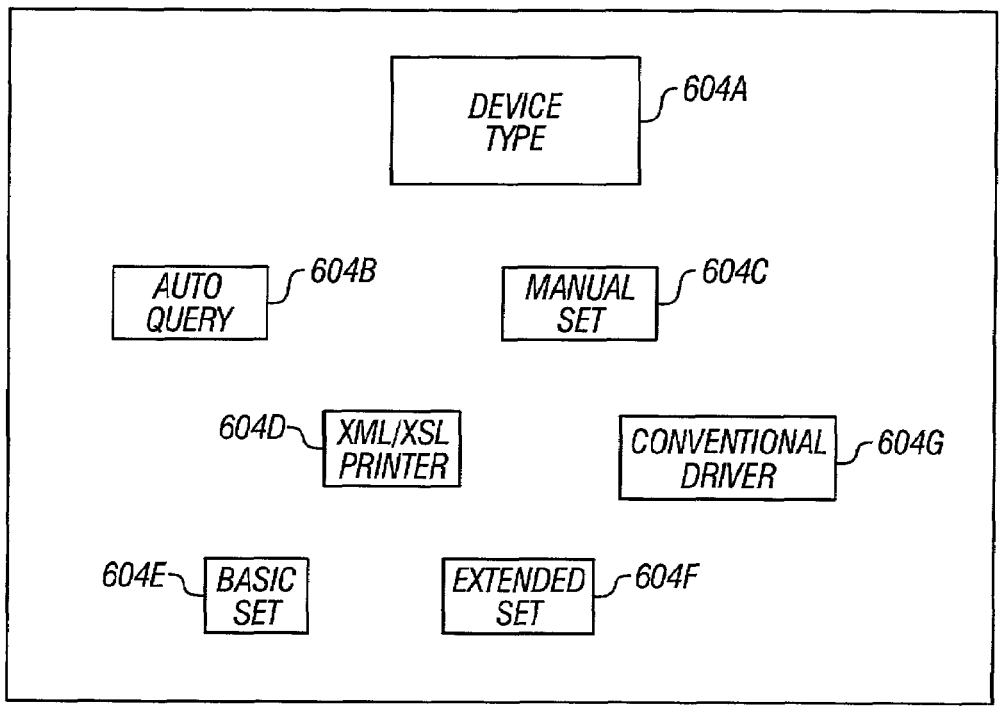
FIG. 6C is an example of a user interface, according to one

FIG. 6C shows an example of a user interface 604 that may be used to set and define a particular printer like printer 104. Option 604A includes a drop-down field that can be used as a shortcut to choose the final printer type as defined by sub-items 604C (manual set) or by automatic query process under 604B.

Manual set 604C includes two sub-items 604D for choosing XML/XSL printer driver and 604G for choosing a non XML/XSL printer driver.

Under 604D, two sub-items are provided, namely, 604E, for a basic set of stylesheets and 604F for an extended set.

XML/XSL printer 604D shows that the printer is capable of printing without the traditional printer driver. Basic set 604E shows that the printer can print using a basic set of tags, while extended set 604F shows that the printer is capable of printing using extended set of tags and or requirements. Conventional driver 604G shows that the printer can print using a conventional driver.

It is noteworthy that the present invention is not limited to any specific user interface. FIG. 6C example is illustrative and is only intended to show how a printer may be configured and is not intended to limit the invention.

FIGS. 7–12 are flow diagrams of computer-executable process steps of a printing system according to one aspect of the present invention. The process steps of FIGS. 7–12 are preferably embodied in computer-executable process steps executed out of RAM 312.

Briefly, FIGS. 7–12 processes include receiving content for printing, determining if the computing device has a printer driver, formatting the content into a mark-up language format based upon pre-loaded style sheets, downloading style sheets and thereafter printing the content.

Figure 7:
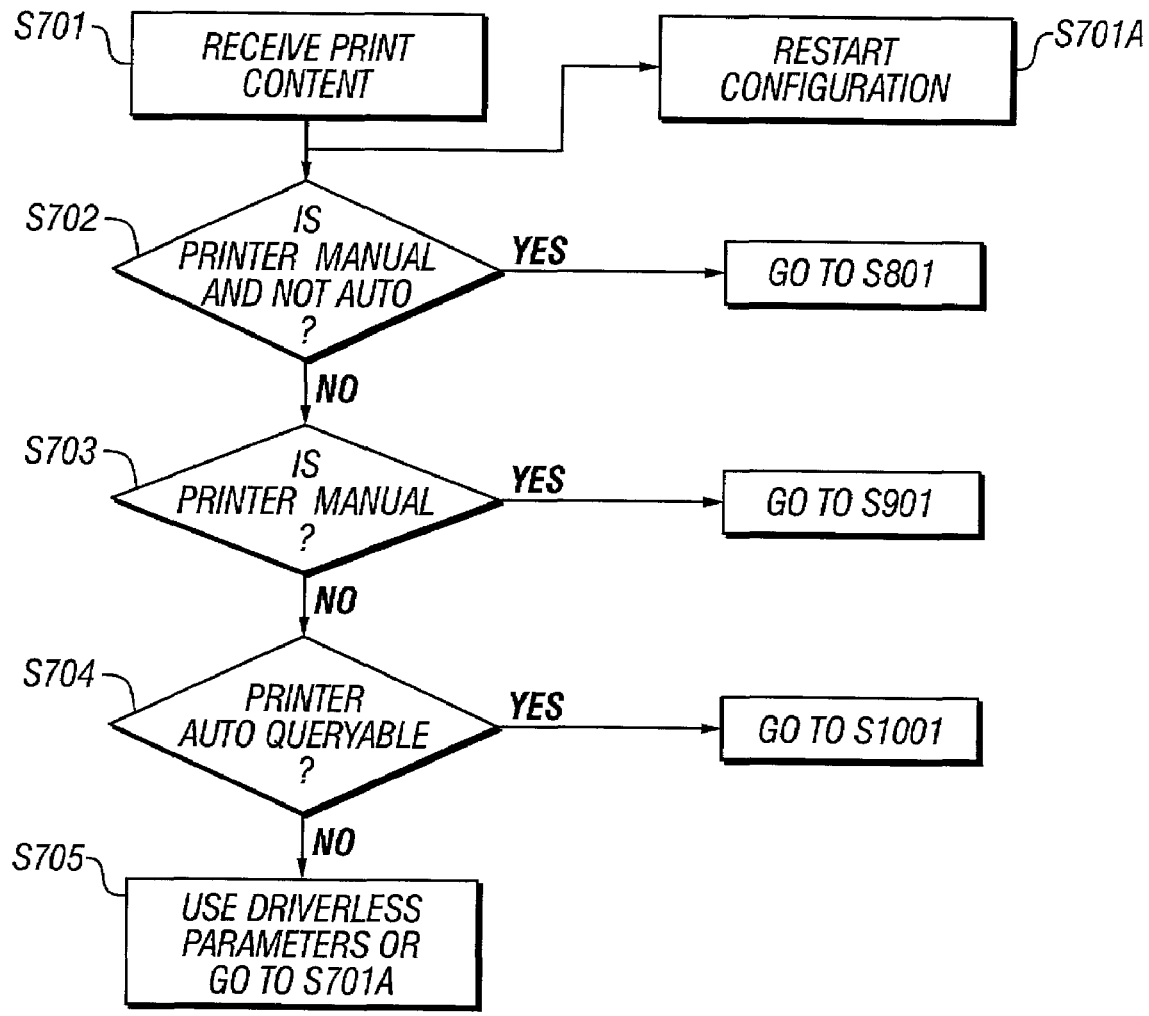
FIGS. 7–12 are flow diagrams showing computer executable process steps for printing data, according to one aspect of the present invention.

Turning now in detail to FIG. 7, in step S701 content 601A is sent by application 601 to printer router 603.

In step S702, handheld device 200 determines via printer router 603 if printer 104 using printer architecture 400 and system 600 may be manually or automatically configured. Typically, the standard TCP/IP protocol may be used for the communication between printer 104 and handheld device 200. Data I/O module 500 receives the request and forwards the request to CPU 501. CPU 501 responds to handheld device 200 requests. If it is determined that printer 104 is only configured manually, then the process goes to step S801 of FIG. 8.

Figure 8:
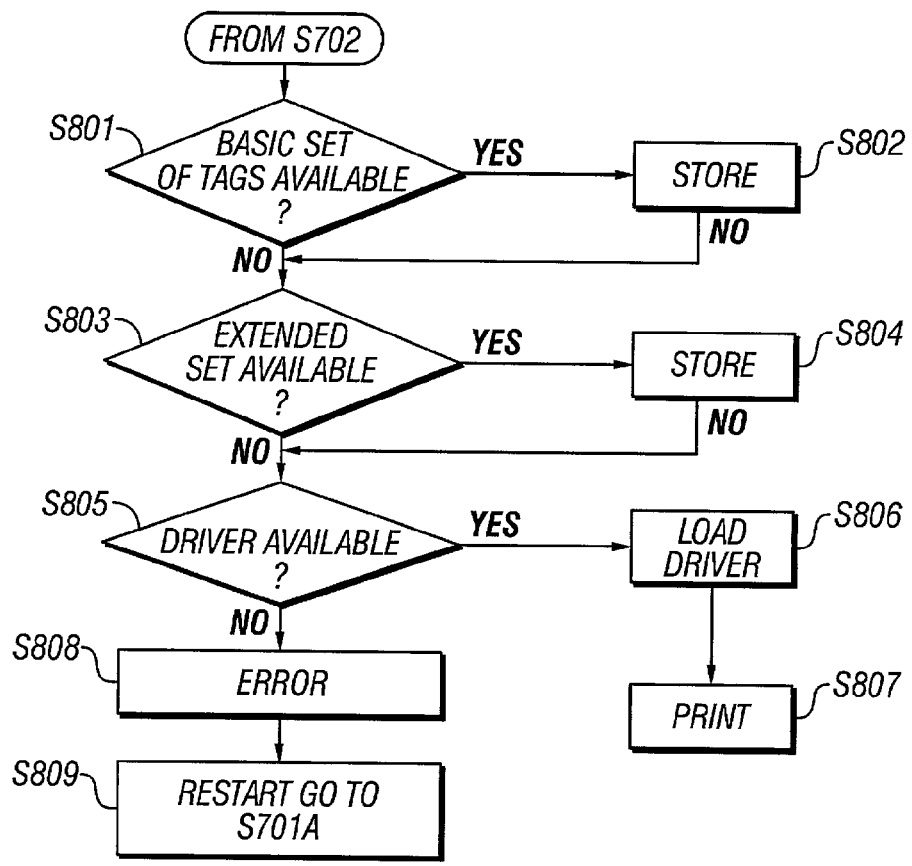

Turning in detail to FIG. 8, in step S801, printer router 603 determines if a basic set of XML tags is available. If the basic set of XML tags is available, then in step S802 printer router 603 stores that information for later use, as discussed below.

In step S803, printer router 603 determines if an extended set of XML tags is available. If an extended set of XML tags is available, then it is stored in step S804 for later use, as discussed below.

If the extended set of XML tags is not available in step S804, then in step S805, printer router 603 determines if a conventional printer driver is available.

If a conventional printer driver is not available, an error message is generated in step S808 and the process may be re-started in step S809 by going back to step S701A in FIG. 7.

If a conventional printer driver is available, then in step S806 the conventional printer driver is loaded and in step S807, the print job is printed using the conventional printer driver.

Figure 9:
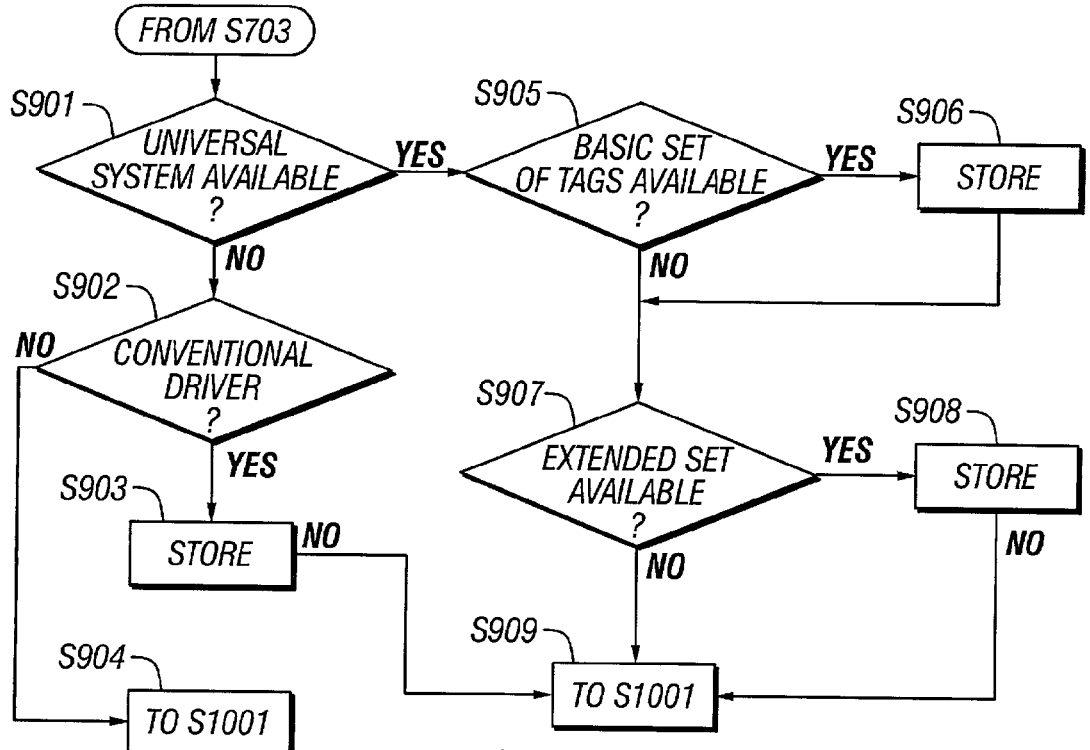

If it is determined by handheld device 200 in step S703 that the printer may be set manually then the process moves to step S901 shown in FIG. 9.

Turning now in detail to FIG. 9, in step S901, printer router 603 determines if a universal printing system, as described above that is not based on conventional printer drivers is available. If the universal printing system is not available then in step S902, printer router 603 searches for a conventional printer driver.

If a conventional printer driver is available, then it is stored in step S903 for later use, as described below, and the process moves to step S1001, in step S909. If the conventional printer driver is not available then the process moves to step S1001, in step S904.

If the universal printing system is available in step S901, then printer router 603 searches for a basic set of tags in step S905. If the basic set of tags are found by selecting option 604E (FIG. 6C), then in step S906, the basic set of tags are stored for later use, as discussed below.

If the basic set of tags is not found, then in step S907, print router 603 searches for an extended set of tags, and if found the extended set of tags is set by menu item 604F (FIG. 6) and stored for later use in step S908, as discussed below. If the extended set is not found in step S907, then the process moves to step S1001, in step S909.

The foregoing steps for storing information is temporary, acquired from the user manual set and the set is stored for later use, as discussed below.

Even if the basic set of tags is found in step S906, printer router 603 may search for an extended set of tags in step S907.

Turning back to FIG. 7, in step S704, handheld device 200 determines if printer 104 is auto-queryable. This is performed by handheld device 200, as discussed above.

Figure 10:
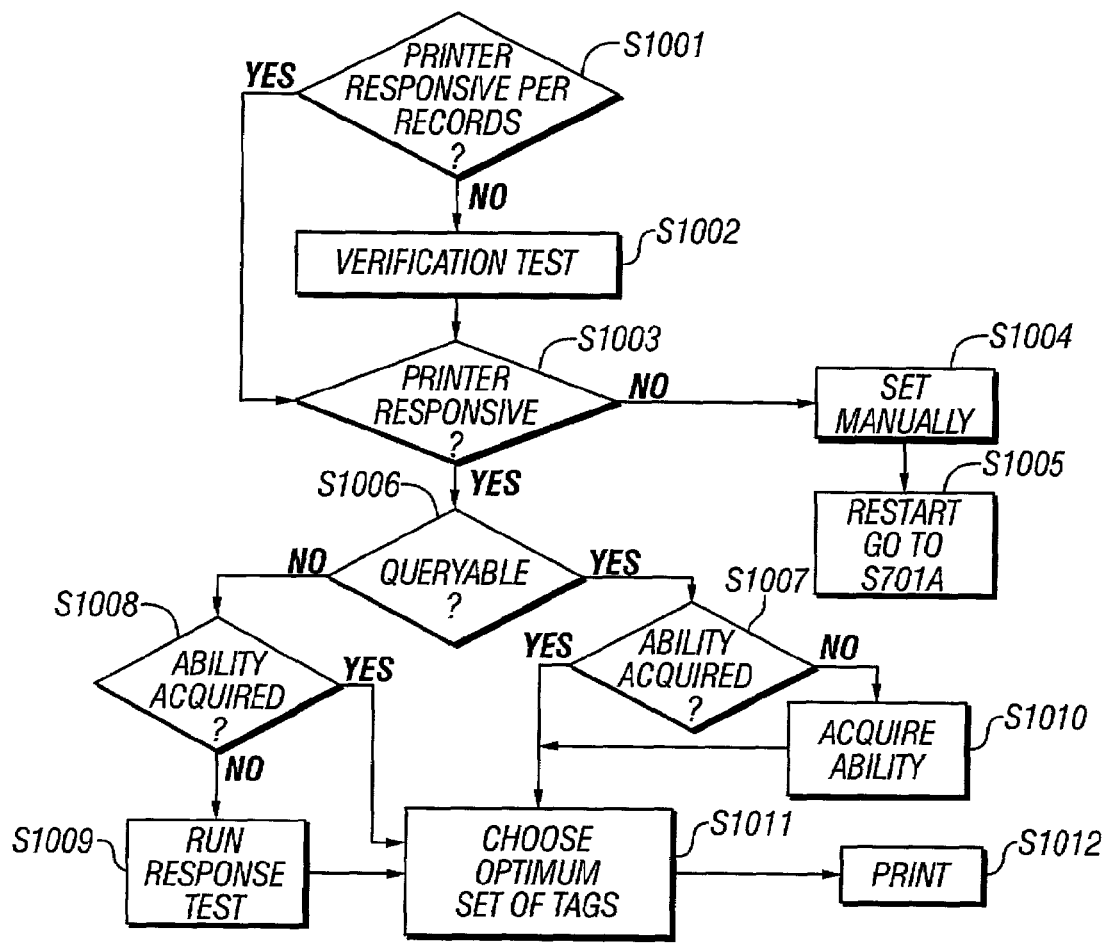

If the printer 104 is auto-queryable, then the process moves to step S1001 in FIG. 10.

Turning now to FIG. 10, which describes the auto-queryable process, printer router 603 determines if printer 104 is responsive based on previous records. If previous record does not indicate anything about printer 104 responsiveness, then a verification sequence is enabled in step S1002 to verify the responsiveness of printer 104. If printer 104 is unresponsive, based upon previous records (S1001) or verification sequence (S1002) then in step S1004, printer 104 may be set up manually by re-starting in step S1005 and by going back to step S701A.

If printer 104 is responsive, then in step S1006, printer router 603 determines if the printer is queryable. If printer 104 is queryable, printer router 603 determines in step S1007 if the ability of the printer 104 is already available. If the ability is not available, in step S1010, ability is acquired by querying printer 104 and the process moves to step S1011.

If printer 104 is command responsive after step S1003, then in step S1008, printer router 603 determines, if the ability of the printer is acquired. If the ability is not acquired, then an ability response test may be performed in step S1009 to determine the ability of printer 104. If the ability information on printer 104 is available, then the process moves to step S1011.

In step S1011, the optimum ability of printer 104 is chosen and content is printed in step S1012. Optimum ability may be chosen automatically by pre-defined parameters or set up manually by a user on a case-by-case basis.

Turning back to FIG. 7 if printer 104 is not auto-queryable, because it could not be manually set, then in step S705, the non-conventional driverless system is used to print per pre-defined basic XML set or extended XMl set.

Figure 11:
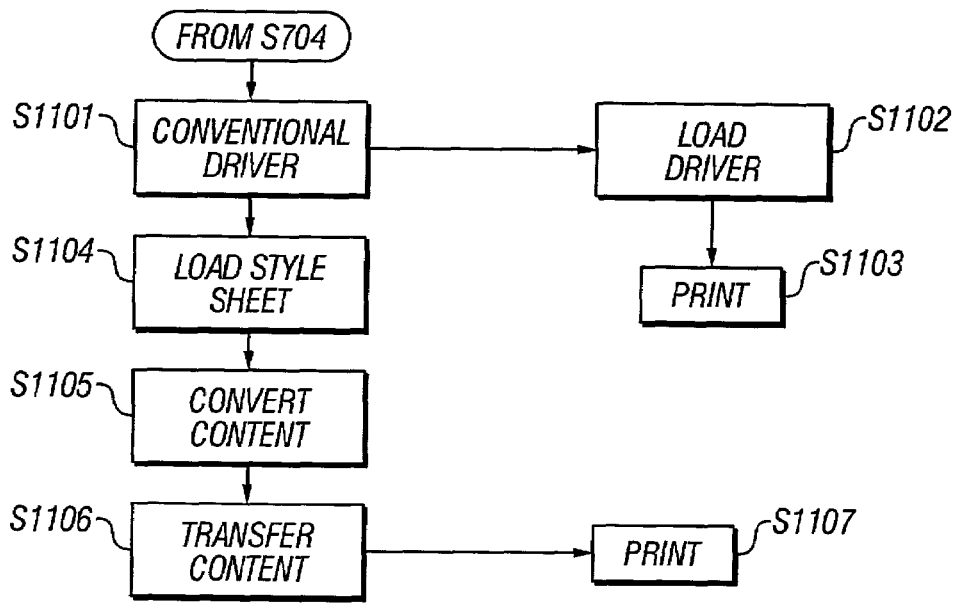

FIG. 11 shows process steps for printing in step S1012. Turning in detail to FIG. 11, in step S1101, printing router 603 determines if a printer driver is used for handheld device 200. It is noteworthy that even if a conventional driver is available, a user may use the XSL/XML sheet to print. If a printer driver is used, then in step S1102, the printer driver is loaded and in step S1103, printer 104 prints content 601A using the traditional printer driver 105 described in FIG. 1.

If no device driver is used, in step S1104, printer router 603 loads the appropriate style sheets. It is noteworthy that style sheets may be loaded from local memory or downloaded using a computer network and/or the Internet.

Figure 12:
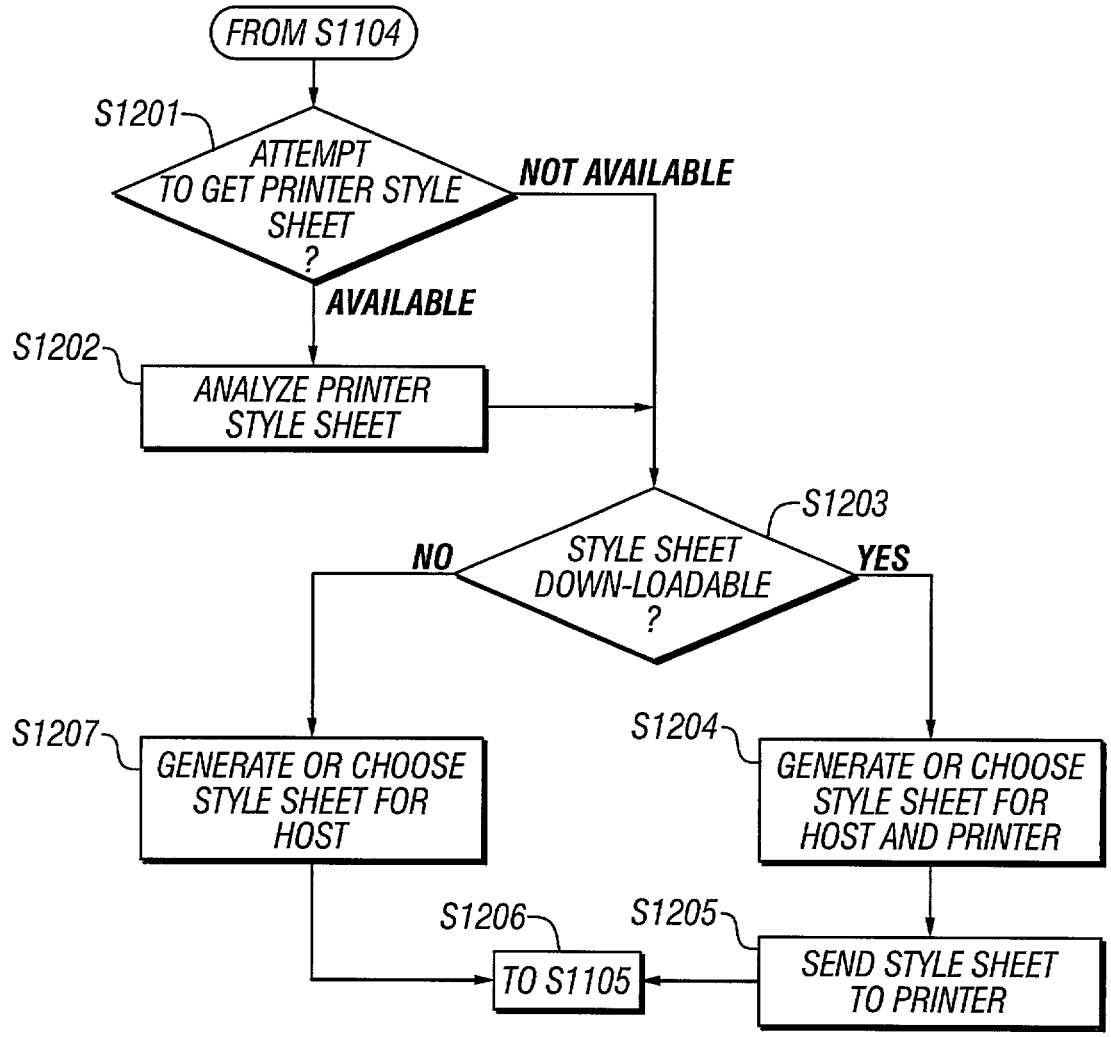

Style sheets may be generated in different ways, e.g., printer 104 may send its style sheet to handheld device 200, which then generates the style sheets. FIG. 12 describes the process steps to load style sheets.

Turning in detail to FIG. 12, in step S1201, printer router 603 tries to receive style sheets from printer 104. If it can receive the style sheets, then the printer style sheets are later analyzed and used with other information on handheld device 200.

In step S1202, printer router 603 evaluates the style sheets from printer 104. If the style sheets are usable by handheld device 200, then they are used in steps S1204 and S1207.

In step S1203, handheld device 200 determines if printer 104 can accept a downloadable style sheet. If yes, the process goes to step S1204. If not, the process goes to step S1207.

In step S1204, handheld device 200 generates a style sheet for itself and for printer 104, and the one for the printer 104 is downloaded in step S1205.

In step S1207, handheld device 200, based on the acquired information about printer 104 decides whether to choose a style sheet from the available style sheets or to generate a style sheet, and the process moves to step S1206.

Now turning back to FIG. 11, in step S1105 print content 601A is converted. Print data generator 602 converts content 601A into a XML document.

In step S1106, print data generator 602 transfers converted content 601B to printer router 603 that transfers content 601B to printer 104.

In step S1107, printer 104 prints content 601B.

In yet another aspect, the present invention does not require memory intensive, device specific printer drivers for printing content from a computing device content.

Although the present invention has been described with reference to specific embodiments, these embodiments are illustrative only and not limiting. Many other applications and embodiments of the present invention will be apparent in light of this disclosure and the following claims.

What is claimed is:

1. A method for printing content from a computing device at a printing device, comprising:
   receiving the content at a printer router;
   determining if the printing device is auto-queryable, wherein determining if the printing device is auto-queryable includes:
      determining, via the printer router, if the printing device is responsive based on previous records;
      determining if the printing device is queryable if the printing device is responsive;
      determining if ability of the printing device has been acquired;
      selecting a set of tags, for setting detail level for printing the content, if the ability has been acquired:
   determining if a conventional driver is available;
   loading style sheets if the conventional driver is not available;
   converting the content into a device independent format based on the style sheets; and
   printing the content in the device independent format.

2. The method of claim 1, wherein the content is converted using a mark-up language.

3. The method of claim 2, wherein the mark-up language defines the content from the computing device.

4. The method of claim 3, wherein the markup language defines the style of the content from the computing device.

5. The method of claim 3, wherein a content description format is preloaded in the computing device.

6. The method of claim 5, wherein the content description format is provided to the printing device.

7. The method of claim 2, wherein the mark-up language is eXtensible Markup Language (XML).

8. The method of claim 5, wherein the content description format is in the extensible Style sheet language ("XSL") or extensible Style sheet language Transformation ("XSLT") format.

9. A computer-readable medium storing computer executable process steps of a printing process for printing content from a computing device at a printing device, comprising of:
   receiving the content at a printer router;
   determining if the printing device is auto-queryable, wherein determining if the printing device is auto-queryable includes:
      determining via the printer router, if the printing device is responsive based on previous records;
      determining if the printing device is queryable if the printing device is responsive;
      determining if ability of the printing device has been acquired;
      selecting a set of tags if the ability has been acquired;
      determining if a conventional driver is available;
      loading style sheets if the conventional driver is not available;
      converting the content into a device independent format based on the style sheets; and
      printing the content in the device independent format.

10. The computer-readable medium of claim 9, wherein the content is converted using a mark-up language.

11. The computer-readable medium of claim 10, wherein the mark-up language defines the content from the computing device.

12. The computer-readable medium of claim 11, wherein the mark-up language defines the style of the content from the computing device.

13. The computer-readable medium of claim 11, wherein a content description format is preloaded in the computing device.

14. The computer-readable medium of claim 13, wherein the content description format is provided to the printing device.

15. The computer-readable medium of claim 10 wherein the mark-up language is eXtensible Markup Language (XML).

16. The computer-readable medium of claim 13 wherein the content description format is in the extensible Style sheet language ("XSL") or extensible Style sheet language Transformation ("XSLT") format.

17. A system for printing content at a printing device from a computing device comprising:
   a computing device;
   a printer router, connected to the computing device, for receiving the content from an application, and determining if the printing device is auto-queryable, wherein determining if the printing device is auto-queryable includes:
      determining, via the printer router, if the printing device is responsive based on previous records;
      determining if the printing device is queryable if the printing device is responsive;
      determining if ability of the printing device has been acquired;
   selecting a set of tags, for setting detail level for printing the content, if the ability has been acquired;
   determining if a conventional driver is available;
   loading style sheets if the conventional driver is not available; and
   converting the content from the computing device into a device independent format based on the style sheets; and
   a universal engine for receiving the content from the printer router, wherein the universal engine converts the content from the application to a mark-up language format; and
   a plurality of style sheets, wherein the style sheets define the format of the content that is converted by the universal engine.

18. The system of claim 17, wherein the style sheets are based on a mark-up language.

19. The system of claim 17, wherein the mark-up language is eXtensible Markup Language (XML).

20. The system of claim 17, wherein the style sheets are in the extensible Style sheet language ("XSL") or extensible Style sheet language Transformation ("XSLT") format.

21. A method for printing content from a computing device at a printing device, comprising:
   receiving the content at a printer router;
   determining if a universal printing system is available;
   storing a basic set of tags, if available, for printing;
   storing an extended set of tags, if available, for printing;
   storing a printer driver, if the universal printing system is unavailable; and
   determining if the printing device is auto-queryable, wherein determining if the printing device is auto-queryable includes:

determining, via the printer router, if the printing device is responsive based on previous records;
determining if the printing device is queryable if the printing device is responsive;
determining if ability of the printing device has been acquired;
selecting a set of tags, for setting detail level for printing the content, if the ability has been acquired;
determining if a conventional driver is available;
loading style sheets if the conventional driver is not available;
converting the content into a device independent format based on the style sheets; and
printing the content in the device independent format.

22. The method of claim 21, wherein the content is converted using a mark-up language and the mark-up language is eXtensible Markup Language (XML).

23. The method of claim 21, wherein the style sheets are in the extensible Style sheet language ("XSL") or extensible Style sheet language Transformation ("XSLT") format.

* * * * *